United States Patent [19]

Widmann et al.

[11] Patent Number: 4,754,667
[45] Date of Patent: Jul. 5, 1988

[54] MACHINING CUTTER TOOLS

[75] Inventors: Erich Widmann, Blaubeuren; Dieter Widmann, Blaustein, both of Fed. Rep. of Germany

[73] Assignee: H.u. E. WIDMANN GmbH & Co KG, Blaubeuren, Fed. Rep. of Germany

[21] Appl. No.: 862,939

[22] Filed: May 14, 1986

[30] Foreign Application Priority Data

May 14, 1985 [GB] United Kingdom ................ 8512190

[51] Int. Cl.⁴ ............................................. B23D 63/14
[52] U.S. Cl. ...................................................... 76/37
[58] Field of Search ................................ 76/37, 40, 41

[56] References Cited

U.S. PATENT DOCUMENTS 4,436,000 3/1984 Lenard et al. .......................... 76/37

FOREIGN PATENT DOCUMENTS 3317085 9/1984 Fed. Rep. of Germany .......... 76/37

Primary Examiner—Roscoe V. Parker
Attorney, Agent, or Firm—Millen & White

[57] ABSTRACT

A method of and apparatus for machining a blade (1) having a plurality of cutting teeth positions with each such position mounting a material cutting tip (7) having faces (13, 16) which co-operate to provide the cutting edge(s) or cutting profile (19) of the teeth, in which the machining of said faces of any tooth is completed before commencing the machining or corresponding faces of next tip to be machined.

12 Claims, 4 Drawing Sheets

MACHINING CUTTER TOOLS

BACKGROUND OF THE INVENTION

This invention relates to the machining of cutting edges on cutting tools having a plurality of teeth provided upon a support, tool body or substrate that is common to all of the teeth.

In particular, the present invention is concerned with the machining of cutting edges on the teeth of tools such as circular saw blades or other tools having a line of cutting teeth such as band saw blades, hack or rack saw blades and the like.

THE PRIOR ART

It is known to form the cutting edges of such tools by providing, especially in the case of circular, and similar blades, at the teeth locations of such blades cutting tips comprising blocks of very hard material such as Cobalt steel, Tungsten carbide or other metallurgically hard material. Such tips are conventionally brazed or otherwise heat sealed to the body of the associated blade body tooth location. Each tip forming block comprises a generally elongate brick-like initial form which is subsequently machined to provide a predetermined shape which affords predefined cutting characteristics to the tip formed from the block.

Conventionally, in the case of the circular saw blade, that surface of the block which is radially directed relative to the blade body and which is secured to the blade body is called the rear face; the surface immediately opposite to this the front face; the surface closest to the centre of the blade body the bottom face; the surface immediately opposite to this face the top face; and the remaining surfaces the side faces. In practice, the intersection between the top and front faces defines the cutting region or edge of the tip. The angular relationships between the top and front faces, the particular form or profile of the top face and the dimensional relationships of the front face profile of a tip relative to an adjacent top face are extremely important in defining and establishing the cutting properties of the saw blade; both from an individual tip aspect and also for the complete blade.

Whilst it is well known to provide cutting tips having a cutting line extending across the full width of the tip, that is effectively across the full width of a kerf being cut by the tip it has been found that blade cutting efficiency can be improved at least for certain cutting conditions by profiling the cutting edge of some of the tips of a blade i.e., adjacent successive, tips differently so that no one tip of any pair of adjacent tips has to effect a cutting operation over the full width of the kerf. With this arrangement an individual tip is not, when in use, subjected to the full effect of the forces required to remove a strip of material equal to the cutting depth and full width of the kerf to be cut. In practice, the differential profiling can involve setting the tip top faces of alternate tips at different heights from the axis of the blade body, bevelling the top face, for example, of alternate tips, thereby producing different cutting edge lengths. In addition, since every tip needs to be machined to very fine dimensional tolerances great importance has to be given to the construction and mode of operation of the apparatus for grinding or otherwise machining the various faces of the cutter tip.

In view of these complexities it has been found that the machining of a blade so that adjacent tips have different cutting profiles introduces considerable problems into the production of tipped saw blades. These difficulties have resulted in the production of relatively complicated and thus costly constructions for machines used for grinding the tips of saw blades to produce a predefined selectably settable cutting profiles to the tips. Furthermore, it has been found, in practice, that the design of the machines has involved the use of complex electronic and electrical control apparatus such as electric stepper motors and associated control equipment in operational situations not especially suitable for the use of such motors and associated equipment. For example, since the grinding processes involve the grinding of ultra-hard materials such as Tungsten carbide it is necessary to use Diamond type wheels together with copious supplies of coolent liquid. As the grinding processes produce large quantities of carbide dust and other debri the immediate region to the grinding point becomes coated with the grinding debri.

OBJECTS OF THE INVENTION

It is an object of the present invention to provide methods and apparatus for facilitating the profile machining of the tips of cutter teeth in such manner that predetermined dimensional and angular relationships between selected faces of the tips can be readily achieved.

A particular object of the present invention is to reduce the number of times a saw blade needs to be indexed through a grinding station of a grinding apparatus in order to be able fully to grind a required form to the requisite faces of all of the tips on a blade being ground.

STATEMENTS OF THE INVENTION

Broadly, according to a first aspect of the invention there is provided a method of machining the cutting teeth of a cutting tool having a plurality of cutting teeth each having surfaces which co-operate to define a cutting profile to the teeth, characterised in that all machining operations required to establish a desired cutting profile for each tooth are completed for a tooth before proceeding to the machining of a next tooth to be machined.

In accordance with a second aspect of the invention there is provided a method of machining a blade having a plurality of cutting teeth positions with each such position mounting a material cutting tip having faces which co-operate to provide the cutting edge(s) or cutting profile of the teeth, in which the machining of said faces of any tooth is completed before commencing the machining or corresponding faces of next tip to be machined.

In accordance with a further aspect of the invention there is provided apparatus for machining a tool having a plurality of cutting teeth each with faces which co-operate to define a cutting edge or profile, characterised in that means are provided for enabling all machining operations required to establish a desired cutting edge or profile to a tooth to be completed for each such tooth before proceeding to the machining of corresponding faces a next tooth to be machined.

Preferably, the machine has at least one tooth machining head arrangement which is arranged for pivotal movement about an axis which lies in a medial plane of the body of a blade when mounted to the machine and whose teeth are required to be machined, whereby any selected teeth can be machined to establish a predetermined cutting profile on any selected tooth or teeth.

According to a still further aspect of the invention there is provided apparatus for grinding the top and front faces of the tips provided upon a tipped cutter blade, the apparatus including means defining at least one grinding station or position, means for supporting a blade so that each tip of the blade can be indexed relative to each said station and position, means for retaining each tip in the indexed position during grinding, first grinding means for enabling the grinding of the front faces of the tips, second means for grinding of the top faces of the tips, the two grinding means being operationally related in such manner that the grinding operations necessary to complete the grinding of the top and front faces of any tip is completed before the blade position is changed to present the next tip to be ground to the grinding station or position.

Preferably, the top and front faces are machined at the same grinding station.

Preferably, the operational movements of the grinding means are effected by means of hydraulic cylinders.

Preferably, when a grinding means is required to provide bevels on a surface to be ground, the grinding means include(s) a first hydraulic cylinder arrangement for positioning a grinding wheel at the requisite setting for producing the unbevelled surface and second hydraulic cylinder arrangement for selectively positioning the grinding wheel so that it is able to produce the required bevel or bevels to the surface being machined without involving relative bodily movement of the grinding head relative to a tip being machined.

Preferably, third hydraulic cylinder arrangements are provided for locking the grinding wheel in its setting intended for producing an unbevelled face.

BRIEF DESCRIPTION OF THE DRAWINGS

For a better understanding of the invention and to show how to carry the same into effect reference will now be made to the accompanying drawings in which.

DESCRIPTION OF THE PREFERRED EMBODIMENTS

Figure 1:
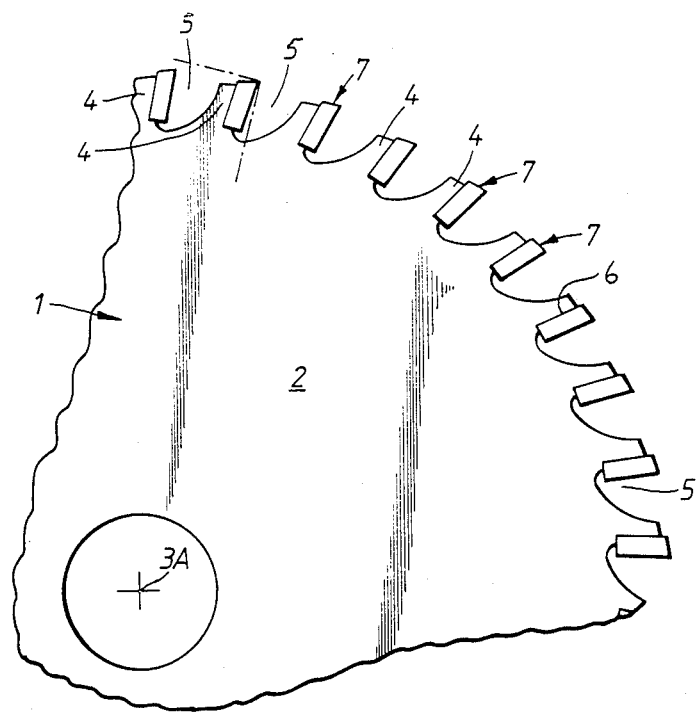
FIG. 1 is a view of a portion of a circular saw blade having teeth with hard material tips.

Referring now to the drawings, FIG. 1 shows a circular saw blade 1 having a body 2 with an aperture 3 for an arbour (not shown) having an axis of rotation 3A. The body has teeth equidistantly spaced around the body periphery with each pair of adjacent teeth effectively separated by a gullet region 5. Each tooth is notched at 6 for receiving and mounting a shaped tip 7 of a material such as Tungsten carbide, Cobalt steel or other metallurgically hard material. Also a polycrystalline material can be used i.e., a Diamond tip. The tooth (FIG. 2) has a stepped front face including upper and lower parts 8 and 9 separated by a step 10. The tooth rear face 11 is formed by a surface 12 which merges into the lower part 9 which latter effectively forms the lower part of the adjacent gullet region 5 to the front of the adjacent tooth.

Figure 2:
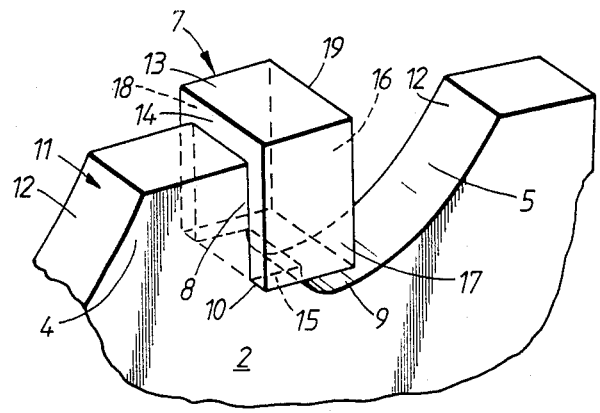
FIG. 2 is an oblique view to an enlarged scale of a schematic representation of a tooth and tip prior to the machining of the tip into its operational shape.

The tip 7 shown in FIG. 2 is initially essentially an elongate block having a top face 13, a rear face 14, a bottom face 15, a front face 16 and side faces 17 and 18. The tip is secured in the step 11 by brazing or other suitable securing method, and projects forwardly of, laterally to both tooth sides, and radially of the blade. The intersection of the top and front faces 13 and 16 defines the cutting edge region 19 of the tip 7 which as shown in FIG. 2 is parallel to the axis 3A.

Figure 3:
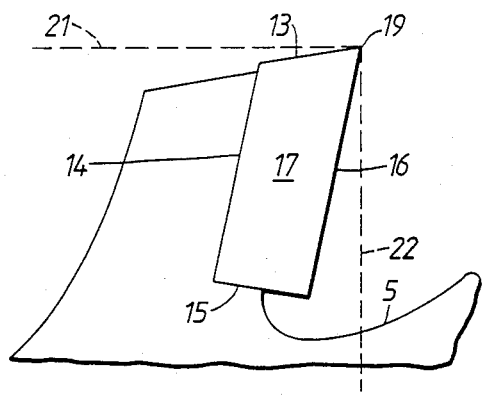
FIG. 3 schematically illustrates a side view of a shaped tip and associated tooth.

As so far described the tip is not suitable for use as a cutting element. In practice, it is necessary to incline the top face 13 to a tangent plane 21 (FIG. 3) to an imaginary cylinder coaxial with the blade and passing through the edge region 19, this inclination defining the so-called top relief angle. In addition, the front face 16 is inclined relative to a radial plane 22 passing through the edge region 19 to produce the so-called front clearance angle which can be positive or negative. The side faces 17 and 18 are also inclined to each other to produce further clearance angles called the side face or flank relief angles. Generally, the side faces 17 and 18 are tapered in a downwards direction to provide at each side of the tip an angle called the tip face appearance angle.

Figure 4:
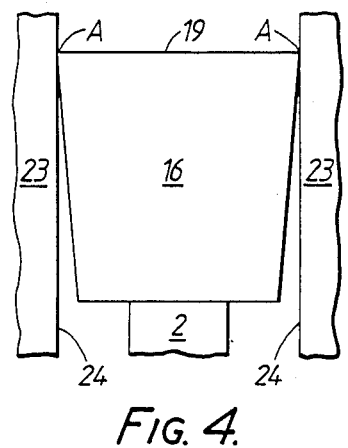
FIG. 4 is a schematic view of the front face of a tip having a first profile.

The general appearance of the tip as so far discussed is shown in FIG. 4 which is a face-on view of the front face 16 and a fragmentary part of the body 2 when in a kerf in a workpiece 23, the kerf having side walls 24. This Figure shows the face appearance angle which is essentially the angle between a plane parallel to the body 2 and passing through an end A of the edge 19. It will be noted that in this Figure the cutting edge extends across the full width of the kerf so that the tip would be subjected to the forces associated with a full cutting width.

Figure 5:
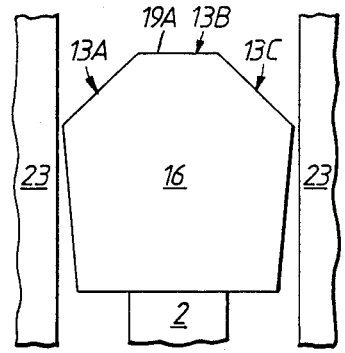
FIG. 5 is a schematic view of the front face of a tip with a bevelled top face.

As has been mentioned it is desirable to profile selected i.e., alternate, tips so that the cutting edge regions 19 of such tips do not span the full width of the kerf. One such mode of shaping the tip to achieve this is to so shape the selected tips that the edge regions 19 thereof are slightly further spaced from the axis 3A as compared with the remaining teeth. Conveniently these selected higher teeth are bevelled. FIG. 5 shows a higher tip which has been profiled by bevelling the top face 13 and the adjacent portions of the sides 17 and 18 lengthwise of the top face.

Figure 6:
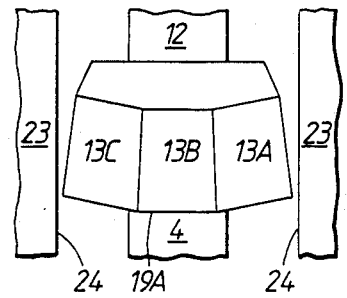
FIG. 6 is a plan view of the tip of FIG. 5.

The bevelling produces at the top face 13 three relatively angled faces 13A, 13B, and 13C (FIG. 6). The faces 13A and 13C are inclined to the plane of the top face and also to the side walls, parts of which latter are removed so that the tip no longer contacts the side walls 24 of the kerf. In practice, the bevel angle chosen is within the range 15 to 60 degrees with a preferred angle of 45 degrees. It is convenient to ensure that the face widths of the faces 13A, 13B and 13C are each equal to one-third of the total length of an unbevelled edge 19. The central face 13B provides the cutting edge 19A since this edge is the only part of the tip that is able to cut into the workpiece 23.

Figure 7:
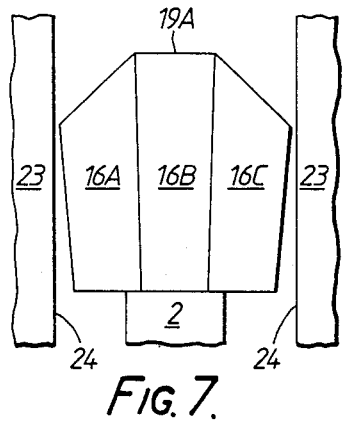
FIG. 7 is a view of a tip having a bevelled front face.

The cutting length of the tip cutting edge 19 can be modified by bevelling the front face (FIG. 7). This bevelling produces a front face with three part faces 16A,16B, and 16C. For the front face the angle of bevel can lie within a range 5 to 45 degrees with a preferred value at 15 degrees. As in the case of top face bevelling it is convenient to bevel in such manner that the three faces 16A,16B and 16C each have a width equal to one-third of the overall width of the unbevelled face.

Figure 8:
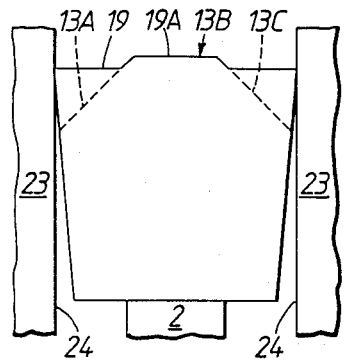
FIG. 8 is a schematic view of the tips of FIGS. 4 and 5 when superimposed one behind the other.

In use, the higher top face profiled tip and the lower top face non-profiled tips are located one behind the other in the direction of cutting of the tipped blade. To illustrate the appearance of a blade with bevelled tips and non-bevelled tips arranged as successive teeth reference will be made to FIG. 8 in which two successive tips have been superimposed such that the respective cutting edges 19,19A are shown in their operational positions relative to the axis of rotation of the blade in the case of a circular saw or the reference line for the non-circular blades.

With this particular tip configuration the tip cutting edges 19A, of the bevelled tips will be restricted in cut to the central regions of the width of the kerf, effectively leaving the side or corner regions of the kerf untouched by its cutting operation, whilst the full width edges 19 which can still cut across the full width of the kerf will only be able to co-operate with corner or edge regions of the kerf since the central part of the kerf will have been removed by the immediately preceding bevelled tip edge 19A.

In practice, the difference in cutting levels of the cutting edges between low and high teeth is very small, for example, 0.3 millimeters. In the Figure the distance between the two cutting levels has been greatly exagerated for the purposes of description.

To machine the top faces as above discussed a grinding wheel has to be presented at the requisite angle to form a top surface with a required top relief angle and at the required distance from the blade axis or reference line so that the cutting edge is set at the required working position, and for a bevelled tip a grinding wheel has to be presented at the second higher level to the tip to be bevelled and in such manner that the tip is bevelled to the required angle and depth without damaging the unbevelled parts of the face. Similar considerations apply to the machining and bevelling of the front faces. Hence the production of profiled tips required relatively complicated grinding sequences involving several distinct grinding stages and operations for each such tip.

The production of the required shaping and angular relationships for the side faces will require further grinding operations. These will not be discussed since the present specification is particularly directed to the grinding of the front and top faces and their inter-relationships.

To produce the desired profiles for the top and front faces of a tipped circular saw blade it is necessary to mount the blade so that the tips can be successively indexed through a grinding station of a grinding machine whilst ensuring that each blade tip to be ground is correctly positioned and locked against movement relative to the grinding station.

In the presently known apparatus the grinding stages required to produce the requisite profiles for the top and front faces are carried out in two distinct phases. Each phase involves separately indexing the blade through a first complete revolution relative to a grinding station during which all of the top or front faces are ground and then reindexing the blade through a second complete revolution during which the remaining front or top faces are ground.

This indexing of the blade through two complete revolutions is in production terms highly undesirable and amongst other things is time consuming and highly non-economic.

In accordance with the Applicant's proposals: for each tip all of the grinding required to prepare the top and front faces of a tip are completed before indexing the blade to the next tip position whereby a blade needs only to be indexed through a single revolution or pass to achieve a complete grinding sequence for the top and front faces.

Figure 9:
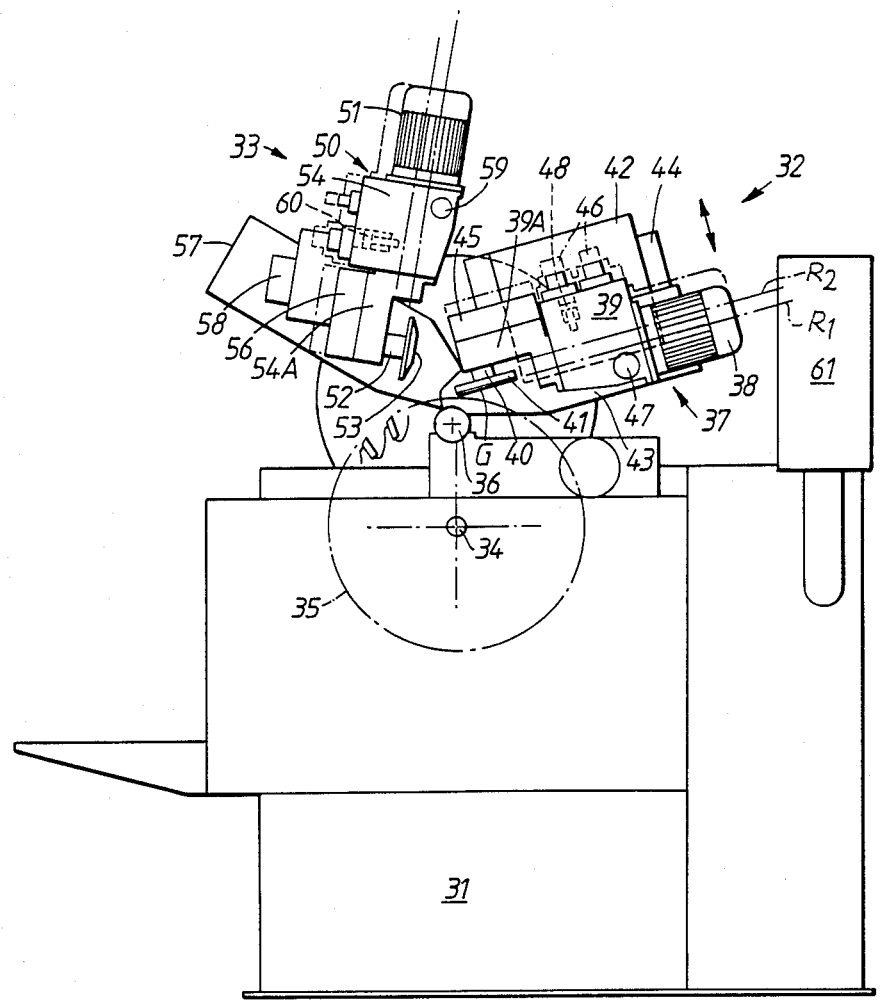
FIG. 9 is a schematic representation of a machine for performing the method of the invention.

Referring to FIG. 9 the apparatus shown therein includes a main frame or housing 31 which mounts two separate grinding wheel assemblies; a top face grinding wheel assembly 32, and a front face grinding wheel assembly 33. The main frame/housing unit 31 mounts a shaft or arbour 34 for carrying in a vertical plane the blade 35 to be ground. A blade indexing and clamping means schematically shown at 36 is provided for indexing the blade tooth by tooth so that each tooth can be successively presented to the grinding position indicated at G in the Figure. The blade mounting arrangements enable a blade to be mounted such that its medial plane can be selectively set in a predetermined plane relative to the grinding station reference planes or locations (to be discussed hereinafter).

To grind a tip in accordance with the concepts of the invention the two grinding wheel assemblies are so mounted from the main frame/housing unit 31 that each assembly can be moved or otherwise transferred between a retracted or inoperative setting and an extended or operative setting. When an assembly is in its retracted position it cannot impede the operation of the other grinding wheel assembly or the indexing of the blade. It is convenient to note that the formation of each grinding wheel assembly and the arbour are such that their respective grinding wheels can be selectively set to accommodate differing blade body thicknesses and blade diameters.

For convenience, the general construction and mode of operation of the two grinding wheel assemblies will be considered separately even though, in practice, their operation will be very closely inter-related.

The grinding of the top faces will now be considered. There are two distinct grinding requirements first the grinding of the tip to define the top relief angle and secondly the grinding of a bevel or bevels if a bevel or bevels should be required.

The grinding wheel assembly for grinding the top faces includes a grinding wheel unit 37 including an electric motor 38, a drive transmission and mounting arrangement 39 for a shaft 40 to which is mounted a grinding wheel 41 arranged to receive drive from the motor 38 by way of the drive transmission arrangement.

The grinding wheel unit 37 is so mounted from a first support 42 schematically shown as a rectangle that the complete unit is bodily movable or displacable between selectable settings in a direction aligned with the longitudinal axis of the grinding wheel shaft 40 with respect to the support 42. The support 42 is itself mounted from a second support 43 to enable movement of the unit 37 in a direction longitudinally of the axis of the motor 38. In other words the unit 37 is effectively selectively displaceable in two major directions transverse to each other with respect to the main frame 31. Conveniently the directions of movement are perpendicular. However, other angles could be used if considered useful.

The mounting of the grinding wheel unit 37 to the support 42 and the latter to the support 43 can include slideway type mounting guides which ensure that displacement movements are along a precisely defined path. In practice, the actual displacement is effected by means of hydraulic cylinders. The hydraulic cylinder 44 controlling the movement of the the support 42 with respect to the support 43 is schematically shown by a rectangle, and that for the control of the movement of the motor unit 37 with respect to the support 42 by a rectangle 45. In each case the amount of displacement can be preset by means of calibrated distance setting control heads such as those schematically shown at 46 for the displacement of the unit 37 with respect to the support 43. The extent of displacement of the motor unit support 43 with respect to the support 42 to set the top face levels is defined between two limit levels indentified as levels R1 and R2. In the Figure the lower level R1 is represented by full line representation of the motor 38 and transmission 39 and the upper level R2 is represented by the dot-dashed representation of the motor 37 and transmission 39.

At this point it is convenient to note that the levels R1 and R2 effectively define for the top face, the maximum and minimum distances of the cutting edge 19 from the aforesaid axis 3A or the reference line.

The displacement of the grinding wheel unit 37 along the line of the longitudinal axis of the motor 38 is between said advanced and retracted positions. This displacement is effected by means of a further cylinder 45 which interconnects between the support 42 and the support 43. As mentioned the direction or path thereof is defined by slide type guides of the form commonly used in metal working machinery. As is the case with such arrangements the extent of the movement can be precisely defined by distance setting control means involving operating heads or the like.

To enable the requisite bevelling of the top face the mounting arrangement 39 for the grinding wheel shaft 40 comprises a section 39A which is pivotable with respect to the remainder of the mounting arrangement 39. The grinding wheel support shaft 40 is able to rotate or swivel with respect to the motor about an axis which is co-axial with the axis of the motor 38. In other words, the grinding wheel is able to pivot clockwise or anticlockwise through a wide range of angles to the aforesaid top face grinding plane in order to enable grinding of the top face to a predefined bevelled profile. It will be understood that the actual direction of the axis of the motor 38 is effectively parallel to the grinding plane for the tip. The basic setting of this can be achieved by various control heads and slide ways which are operable to enable selective adjustment of the motor axis with respect to the remainder of the machine.

The control of this pivotal movement is effected by means of a hydraulic cylinder depicted by the circle 47. A further hydraulic cylinder 48 is provided for locking the shaft 40 in its setting perpendicular to the grinding plane. This setting defines the setting for the top face grinding wheel 41 when required to grind a flat top face.

It will be understood that the shaft 40 is able to pivot under the control of, for example, position control means (not shown) so that the grinding wheel angle can be adjusted to accommodate various top relief angles.

An electrical/electronic control arrangement 61 is provided for controlling and sequencing the operation of all of the hydraulic cylinders of the apparatus and the switching of the motors. Since the sequencing circuitry involved does not form part of the grinding methods proposed by the invention a detailed discussion of the circuitry is not thought necessary in the present specification.

The grinding of the front face will now be considered. There are two distinct requirements first the grinding of the tip to set the angular setting of the front face relative to the remainder of the tip and secondly the grinding of the bevels if front face bevelling is required.

The assembly 33 is of a construction which is generally similar to that of the previously described assembly 32. In the circumstances it is thought that a detailed description of the assembly is not required. Thus only the major components will be specifically mentioned. Thus the assembly 33 includes a grinding wheel drive unit 50 including an electric motor 51, a mounting shaft 52 for a grinding wheel 53 and a drive transmission arrangement 54 including a gear box (not shown) between the motor 51 and the shaft 52. The drive unit 51 is supported by a support 55 in such manner that the drive unit 51 can be bodily displaced up or down along the line of the longitudinal axis of grinding wheel shaft 52 by means of a hydraulic cylinder very schematically illustrated by the rectangle 56.

The support 55 and the motor unit 51 carried thereby are mounted for displacement along the direction of the longitudinal axis of the motor 51 by a further support 57 by means of a further hydraulic cylinder 58. It will be understood that the supports 55,57 will incorporate the slide guideway arrangements for controlling the direction of the components mounted therefrom.

To enable the requisite bevelling of the front face the the drive transmission arrangement 54 incorporates a section 54A which is pivotally mounted to the remainder of the arrangement 54 whereby the grinding wheel support shaft 52 is able to pivot with respect to the motor about an axis which is co-axial with the axis of the motor 51. In other words the grinding wheel 53 is able to pivot clockwise or anticlockwise through a wide range of angles to the setting thereof that defines the position of an unbevelled front face of the blade whose tips are to be ground.

The control of this pivotal movement is effected by means of a hydraulic cylinder depicted by the circle 59. A further hydraulic cylinder 60 is provided for locking the shaft 52 in its setting in which the shaft lies in the plane for an unbevelled front face.

Control arrangements for the fine positioning of the grinding wheel will be provided as for the previously discussed top face grinding assembly.

The operation of the machine is generally as follows. For convenience of description the grinding of a front face with or without bevelling will be regarded as the first face to be ground on each tip.

Initially the two grinding wheel assemblies 32 and 33 are moved to their retracted settings. A blade 35 to be ground is mounted upon the arbour 34 and the indexing/clamping arrangements 36 are operated by means of the control arrangement 61 to position the first tip to be ground in the correct grinding position and to ensure that the blade is firmly clamped against any movement during a grinding operation. As mentioned the blade is vertical with the medical plane located in a precisely predetermined position with respect to to grinding assemblies. In practice, this medial plane will intersect vertical planes including the respective axes of the drive motors 38 and 51. Arrangements (not shown) can be provided for enable positional adjustment of the blade along the arbour to accommodate blade thickness variations.

The front face grinding wheel assembly is then caused to move its grinding wheel into the grinding plane by moving the unit 50 to its extended or operational setting by means of cylinder 56 to position the wheel 53 in the required grinding plane. The further cylinder 58 is then operated to move the grinding wheel move into grinding contact with the tip front face to effect its grinding operation. Assuming that this particular front face is not to be bevelled after completion of the grinding stroke the cylinders are operated to remove the grinding wheel from the grinding position and to return the unit 33 back to its retracted position. These operation are under the control of the electrical/electronic control arrangements schematically shown at 61 which as indicated are arranged to control the sequencing of the operation of all of said hydraulic cylinders according to user requirements whereby the grinding assembly will automatically be returned to its retracted position on completion of a grinding operation. It will be understood that the control arrangements 61 will likewise control the advance of the unit 33 to effect grinding.

If it is desired to bevel the front face the control arrangements will move the grinding wheel in the direction of the motor axis by a distance sufficient to avoid contact between the grinding wheel and the tip front face, cause the hydraulic cylinder 60 to operate to release the pivotable arrangement section 56A and then cause the cylinder 38 to pivot the grinding wheel to the required bevel angle to one side of the front face and then cause the grinding wheel to execute a second grinding operation. After this the grinding wheel is retracted, pivoted in the opposite direction, advanced to produce the bevel on the opposite side of the front face. After this the grinding wheel is retracted, returned to and locked in the start setting for an unbevelled front face. Finally the assembly is then returned to its retracted position. The sequencing of these movements is under the control of the control arrangement 61.

The top face grinding wheel assembly 32 is then brought into operation and will be caused to carry out under the control of the arrangement 61 a series of operational movements generally similar to those described for the assembly 33.

It will be presumed that the first top face to be ground is one which is not to be bevelled so that it is merely necessary to set the grinding wheel 41 to the angle and level necessary to grind a top face.

Thus the control heads 46 would be set to select the cutting height and the requisite hydraulic cylinder 44 operated to position the motor unit 37 at the correct position relative to the limit levels R1 and R2.

Thus, for example, it will be presumed that the level R1 is selected since a low tip is required as it is not to be bevelled. The cylinder 48 is operated so as to lock the top face grinding wheel shaft 40 in said vertical setting relative to the medial plane. The grinding wheel unit 37 is then advanced so as to effect the actual grinding stroke. Following this the hydraulic cylinder 48 is operated to remove the grinding wheel from the tip to avoid damage to the tip and the previously mentioned subassembly is then moved by its cylinder so that the grinding wheel is returned to the retracted setting.

The control arrangement 61 then enables the indexing of the blade to bring the next tip to be ground into the grinding position.

The above discussed sequence of operations will be repeated or varied according to whether or not a tip is to be bevelled. For example, if the next tip to be ground has to have a bevelled top face, the grinding wheel 41 will be set to the higher level that is at level R2. The precise form for the tips of a blade may be programmed into the control arrangement 61. It will be noted that the indexing takes place only after all of the requisite grinding of the front and top faces of a tip have been completed. In other words the grinding of the top and front faces is completed during a single revolution or pass of the blade through the grinding station of the machine.

If desired, arrangements may be provided for reversing the direction of rotation of the grinding wheel during the grinding of the various faces so that optimum grinding directions can be assured during the grinding of the bevels.

Figure 10:
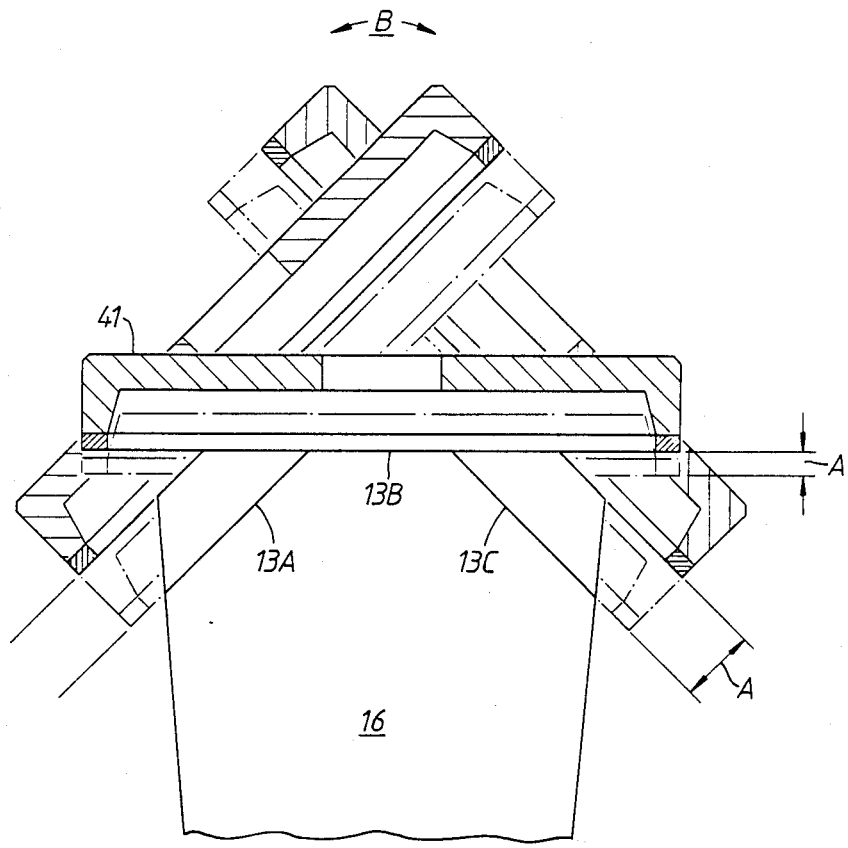
FIG. 10 is a sectional view of a grinding wheel in various positions with respect to a tip during the grinding of a bevel in the top face of a tip.

FIG. 10 very schematically illustrates to a very enlarged scale the relative positioning of a grinding wheel 41 relative to a tip top face during bevelling operations and in particular illustrates the bevelling of a top face and thus the positioning of the grinding wheel 41 with respect to a tip 7.

The horizontally arranged wheel is indicating the grinding of the top surface for either form of top grinding. The inclined positions of the grinding wheel 41 shows the grinding of the bevels. The full line positioning shows an early stage in the formation of a bevel whilst the dot-dash lines illustrate the position at a later stage of the bevelling operation.

In relation to the horizontal grinding wheel the distance A represents the difference in levels of the high level top face and low level top face. The distance A for the bevelling operation illustrates the depth of bevel.

It will be understood that if desired the angle and depth of bevelling could be such that the cutting line is reduced to a point. That is to say the upper region of the bevel becomes triangular.

We claim:
1. Apparatus for machining a planar tool having a plurality of cutting teeth with each tooth having faces which cooperate to define at least one cutting edge or profile, comprising;
   means for mounting a tool to be machined;
   a first motor unit having a first drive shaft;
   a support for mounting the first motor unit such that the first drive shaft lies along a first direction that is parallel to the plane of the tool, and such that the motor is bodily displaceable in said first direction and also in a second direction transverse to the first direction and parallel to said plane of the tool;
   a first driven shaft having a first end adapted to mount a first grinding wheel and a second end connected to receive drive from the first drive shaft and arranged to be rotatable about an axis transverse to that of the first drive shaft;
   means for mounting the first driven shaft so that it is bodily pivotable about said first direction whereby the axial direction thereof can be selectively displaced with respect to the plane of the tool thereby correspondingly to change the angle made by the grinding wheel to the plane of the tool;

a second motor unit having a second drive shaft;

a support for mounting the second motor unit such that the second drive shaft lies along a third direction that is parallel to said plane of the tool, and such that the second motor unit is bodily displaceable in said third direction and also in a fourth direction transverse to the third direction and parallel to said plane of the tool;

a second driven shaft having a first end adapted to mount a second grinding wheel and a second end connected to receive drive from the second drive shaft and arranged to be rotatable about an axis transverse to that of the second drive shaft;

means for mounting the second driven shaft so that it is bodily pivotable about said third direction so that the axial direction thereof can be selectively displaced with respect to the plane of the tool thereby correspondingly to change the angle made by the second grinding wheel to said plane of the tool.

2. Apparatus as claimed in claim 1, in which said first direction is arranged to be effectively parallel to the required grinding plane of the tooth face to be machined by the grinding wheel.

3. Apparatus as claimed in claim 1, and comprising first hydraulic means for bodily moving the first motor unit along said first direction.

4. Apparatus as claimed in claim 3, and comprising second hydraulic means for displacing the first motor unit in said second direction thereby to set the grinding wheel to either of a first and second position with respect to the face to be ground, such first and second positions being respectively representative of first and second face grinding levels for said grinding plane.

5. Apparatus as claimed in claim 4, and including third hydraulic means adapted for swinging the first driven shaft and thus the first grinding wheel about said first direction so as to enable bevelling of a face to be ground.

6. Apparatus as claimed in claim 5, and in which the third hydraulic means is arranged so to displace the first driven shaft and the grinding wheel carried thereby through such angle with regard to the plane of the tool whose teeth are to be machined that the ground faces are bevelled in such manner that each ground portion of a face is one-third of the overall width of the face prior to grinding.

7. Apparatus as claimed in claim 5, in which the bevelling is such as to produce two flank portions at an angle to an intermediate portion, with each said portion having a width equivalent to one-third of the width of the unground face.

8. Apparatus as claimed in claim 1, and in which said third direction is arranged to be effectively parallel to the required grinding plane of the tooth face required to be machined by the second grinding wheel.

9. Apparatus as claimed in claim 5, and comprising fourth hydraulic means for bodily moving the second motor unit along said third direction.

10. Apparatus as claimed in claim 9, and comprising fifth hydraulic means for displacing the second motor unit in said fourth direction so as to set the second grinding wheel to a desired position with respect to the face to be ground by the second grinding wheel.

11. Apparatus as claimed in claim 9, and including further hydraulic means adapted for swinging the second driven shaft about said third direction so as to position the second grinding wheel in such position as to enable bevelling of a face to be ground.

12. Apparatus as claimed in claim 11, and in which the further hydraulic means is arranged so to displace the second driven shaft and the second grinding wheel carried thereby through such angles with regard to the plane of the tool whose teeth are to be machined that the ground faces are bevelled in such manner that each ground portion of a faces is one-third of the overall width of the face prior to grinding.

* * * * *